United States Patent [19]

Kamon et al.

[11] Patent Number: 5,481,371
[45] Date of Patent: Jan. 2, 1996

[54] IMAGE READING DEVICE HAVING VARIABLE INTERNAL SYNRONIZATION SETTING CONTROL

[75] Inventors: Kouichi Kamon, Yokohama; Hiroyuki Kawamoto, Kawasaki, both of Japan

[73] Assignee: Ricoh Company, Ltd., Tokyo, Japan

[21] Appl. No.: 22,910

[22] Filed: Feb. 26, 1993

[30] Foreign Application Priority Data

Feb. 28, 1992 [JP] Japan .................................. 4-043164

[51] Int. Cl.$^6$ .................................................. H04N 1/36
[52] U.S. Cl. ........................................ 358/410; 358/409
[58] Field of Search .................................. 358/471, 474, 358/475, 486, 481, 412, 261.1, 448, 409, 410

[56] References Cited

U.S. PATENT DOCUMENTS

| | | | |
|---|---|---|---|
| 4,079,425 | 3/1978 | Vandling | 358/410 |
| 5,014,137 | 5/1991 | Shimada | 358/410 |
| 5,164,845 | 11/1992 | Takeuchi | 358/410 |
| 5,202,774 | 4/1993 | Ishimitsu | 358/474 |
| 5,239,393 | 8/1993 | Takeuchi | 358/474 |
| 5,283,662 | 2/1994 | Nakajima | 358/409 |

*Primary Examiner*—Edward L. Coles, Sr.
*Assistant Examiner*—Kimberly A. Williams
*Attorney, Agent, or Firm*—Oblon, Spivak, McClelland, Maier & Neustadt

[57] ABSTRACT

An image reading device has a photoelectric transducer for scanning an image to read it line by line and converting the resulting optical data to an electric signal. A driver drives the photoelectric transducer in response to a synchronizing signal. An internal period signal generating circuit generates an internal period signal having a predetermined period. A period setting circuit sets the predetermined period of the internal period signal. A synchronization switching circuit selects and outputs either of the internal period signal or an external period signal sent from the outside of the image reading device as the synchronizing signal. Even when an external period signal from an image recorder including a polygon motor or similar external apparatus is not available or when the external apparatus is not operated, the device can surely read a document. When the device is used as a terminal unit of an external apparatus, it can flexibly match itself to the external apparatus with respect to the synchronizing signal.

3 Claims, 10 Drawing Sheets

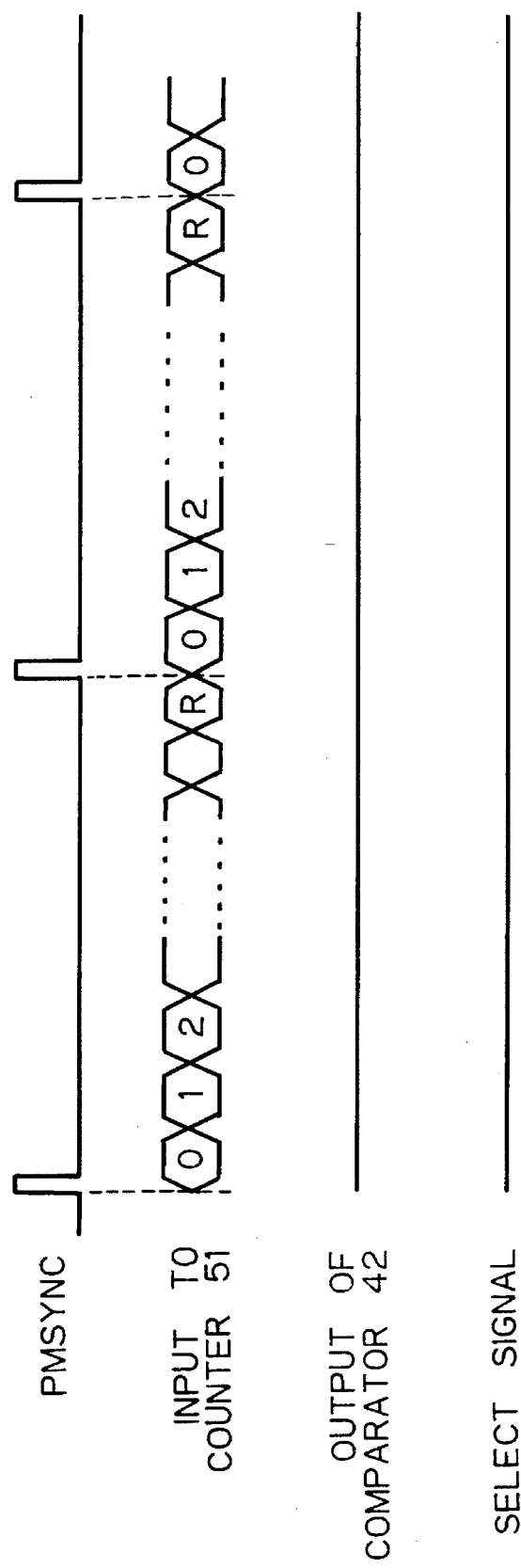

1

IMAGE READING DEVICE HAVING VARIABLE INTERNAL SYNRONIZATION SETTING CONTROL

BACKGROUND OF THE INVENTION

The present invention relates to an image reading device advantageously applicable to a copier or similar image forming apparatus.

In a digital copier, for example, a scanner scans a document to generate a corresponding image signal. The electric signal is transformed to digital data, subjected to predetermined image processing, and then sent to a printer incorporating a laser diode or similar light emitting device. The printer optically modulates the light emitting device on the basis of the digital image data. As a result, a light beam issuing from the light emitting device scans a photoconductive element to reproduce the document image thereon.

In an image forming apparatus of the type including a laser diode, for example, a laser beam issuing from the laser diode is steered by a polygonal mirror which is rotated at a high speed by a polygon motor. In practice, it is difficult to maintain the rotation speed of the polygon motor constant. It is, therefore, a common practice to control a document read timing by locating a beam sensor at a position where the laser beam starts scanning the photoconductive element. Specifically, the beam sensor generates a line synchronizing signal (LSYNC) synchronous to the rotation of the polygon motor and delivers this signal to the scanner. Since a substantial period of time is necessary for the polygon motor to reach a steady rotation speed after the start of the drive, it has been customary to continuously rotate the polygon motor at a constant speed even when the image forming apparatus is in a standby state. More specifically, the polygon motor is continuously driven so long as the power switch of the apparatus is turned on. This not only degrades the durability of the polygon motor but also generates noise.

Today, a multiplex digital copier configuration is attracting increasing attention in which an external line is connected to a digital copier to effect facsimile transmission and reception or a personal computer is connected to a digital copier to use it as an image data input and output terminal. In this kind of application, even when the copier does not have to perform a copying operation, e.g., when facsimile data is to be transmitted, the copier has to wait until the polygon motor reaches the steady rotation speed after the turn-on of the power switch and then read a document image in response to the line synchronizing signal from the beam sensor. This wastes time and, in addition, drives the polygon motor hard.

In the light of this, Japanese Patent Publication No. 6270/1990, for example, proposes an improved image reading device using signal generating means which generates, when an external synchronizing signal is not available with an external apparatus, a false synchronizing signal by counting pulses of a clock synchronous to an image signal from reading elements. The signal generating means is provided independently of inputting means for inputting the external synchronizing signal. A drive signal for driving the reading elements is generated in response to the external synchronizing signal or the false synchronizing signal. Hence, even when the external synchronizing signal from the external apparatus is not inputted, the reading elements can be desirably driven on the basis of the false synchronizing signal. Stated another way, even before the polygon motor starts up or when the printer is out of operation, the image reading device can read a document. However, the problem with this type of image reading device is that reading errors occur while the scanner reads a document, and it is difficult to match the device to the external apparatus with respect to the synchronizing signal.

SUMMARY OF THE INVENTION

It is, therefore, an object of the present invention to provide an image reading device which allows, even when an external period signal from an image recorder including a polygon motor or similar external apparatus is not available or when the external apparatus is not operated, a scanner to surely read a document and flexibly matches itself, when the image reading device is used as a terminal unit of an external apparatus, to the external apparatus with respect to the synchronizing signal.

An image reading device of the present invention comprises a photoelectric transducer for scanning an image to read it line by line and converting the resulting optical data to an electric signal, a driver for driving the photoelectric transducer in response to a synchronizing signal, an internal period signal generating circuit for generating an internal period signal having a predetermined period, a period setting circuit for setting the predetermined period of the internal period signal, and a synchronization switching circuit for selecting and outputting either the internal period signal or an external period signal sent from the outside of the image reading device as the synchronizing signal.

BRIEF DESCRIPTION OF THE DRAWINGS

The above and other objects, features and advantages of the present invention will become more apparent from the followed detailed description taken with the accompanying drawings in which.

DESCRIPTION OF THE PREFERRED EMBODIMENTS

Figure 8:
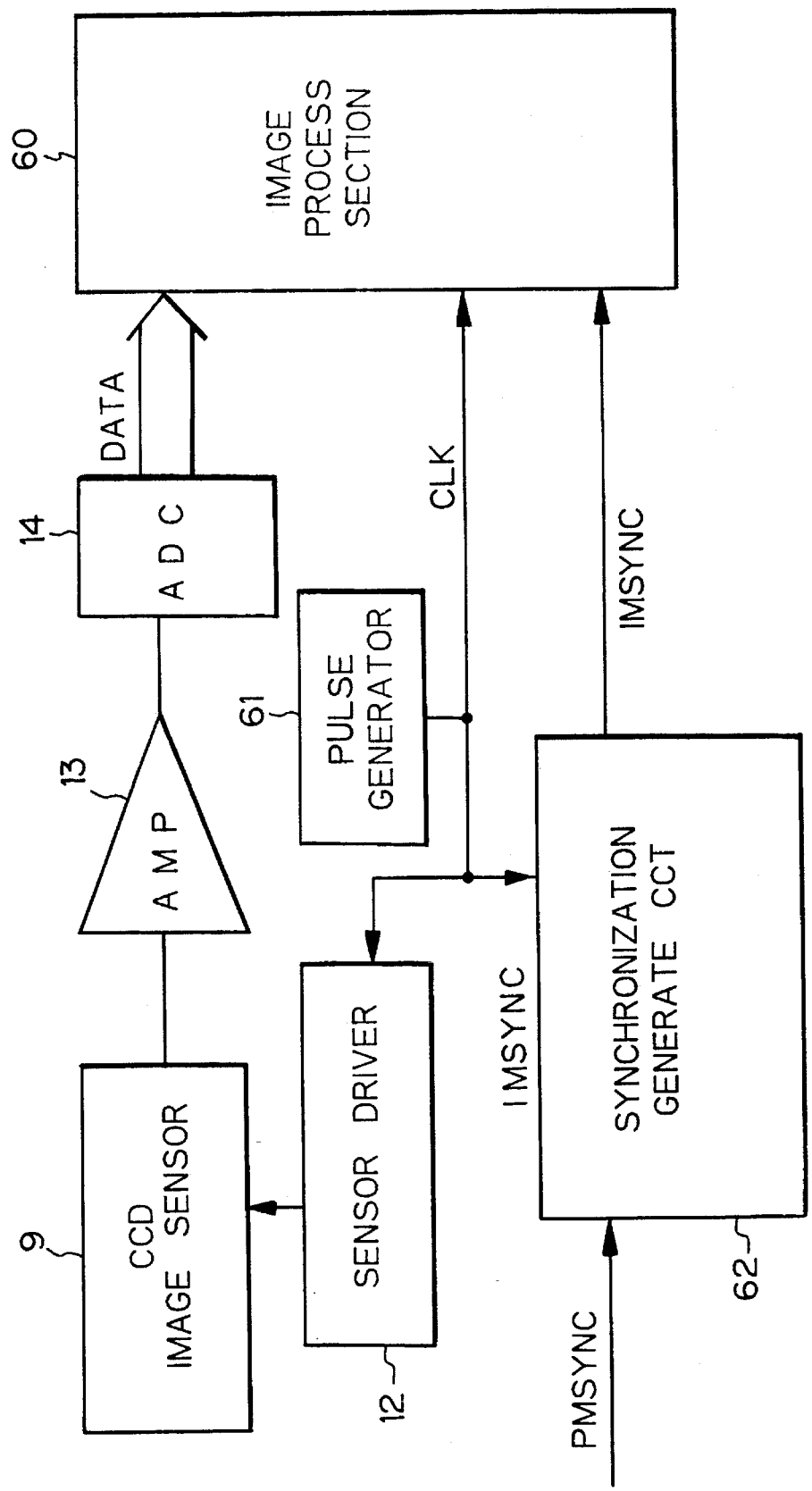
FIG. 8 is a block diagram schematically showing a conventional image reading section.
Figure 9:
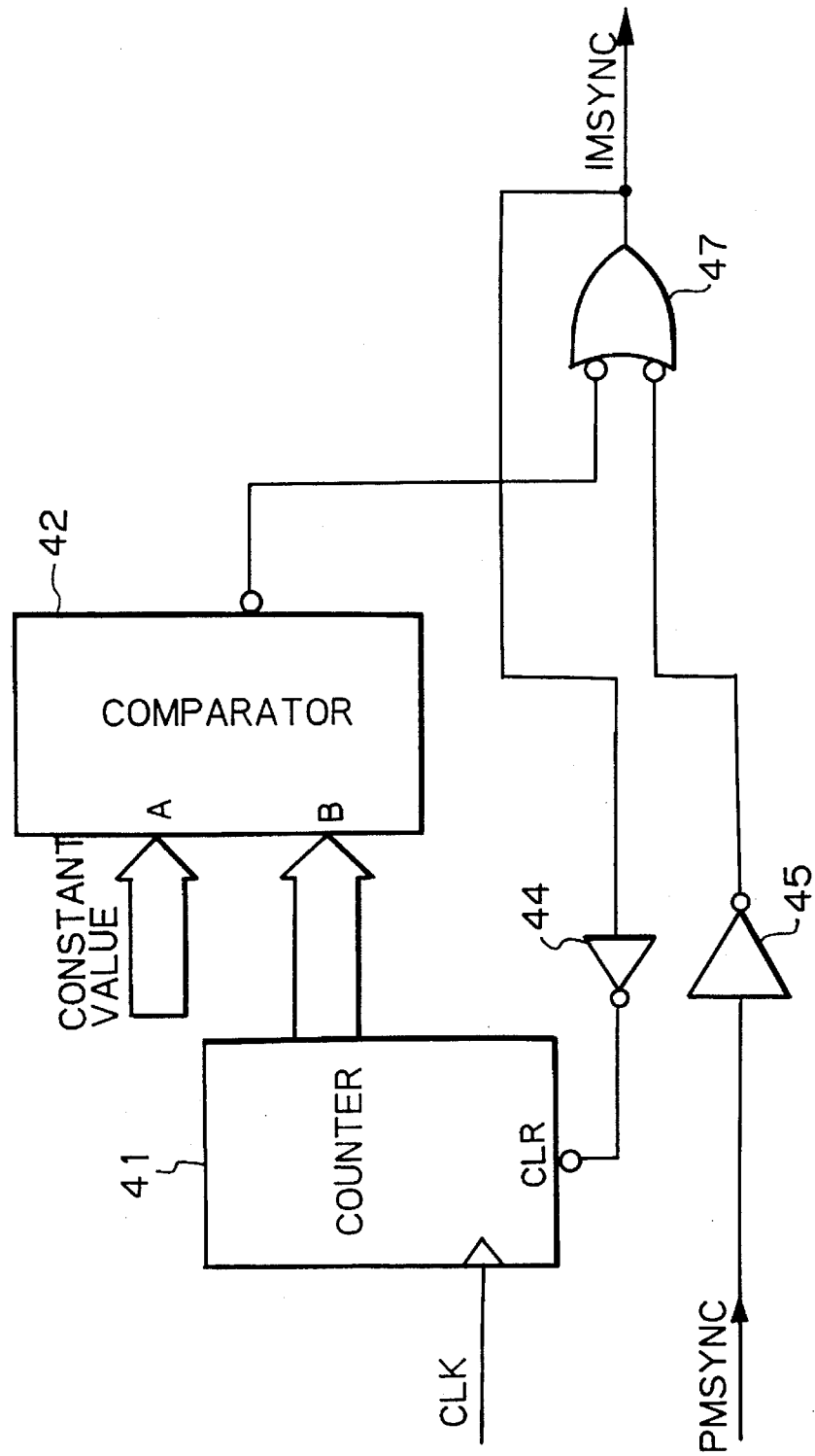
FIG. 9 is a block diagram schematically showing a conventional synchronization generating circuit.

To better understand the present invention, a brief reference will be made to a prior art image reading section and a prior art synchronization generating circuit, shown in FIGS. 8 and 9, respectively. As shown, an image signal generated by a CCD image sensor (solid state imaging device) 9 is amplified by an amplifier (AMP) 13, converted to a digital signal by an analog-to-digital converter (ADC) 14, and then subjected to various kinds of image processing by an image processing section 60. The CCD image sensor 9 is driven by a sensor driver 12. Applied to the sensor driver 12 are a clock signal CLK from a pulse generator 61, and a read synchronizing signal IMSYNC for providing a line-by-line read timing. A synchronization generating circuit 62 generates the read synchronizing signal IMSYNC in response to the clock signal CLK and a laser beam detection signal (PMSYNC) from a printer.

A counter 41 counts the pulses of the clock signal CLK while delivering the count to a comparator 42. The comparator 42 compares the count from the counter 41 with a constant value applied to the other input thereof and generates a false synchronizing signal ITSYNC when the former exceeds the latter. The false synchronizing signal ITSYNC is applied to an OR gate 47 together with an inverted signal of the laser beam detection signal PMSYNC from an inverter 45. The read synchronizing signal IMSYNC from the OR gate 47 is fed to the sensor driver 12. At the same time, this signal IMSYNC is inverted by an inverter 44 and then applied to the counter 41 as a reset signal.

So long as the laser beam detection signal PMSYNC is applied to the synchronization generating circuit 62, it is outputted as the read synchronizing signal IMSYNC via the OR gate 47. However, when the signal PMSYNC disappears or has the frequency thereof reduced, the comparator 42 generates the false synchronizing signal ITSYNC. The signal ITSYNC is outputted as the read synchronizing signal IMSYNC via the OR gate 47. The constant value or reference value applied to the comparator 42 is selected such that the read synchronizing signal IMSYNC has a slightly longer period than the laser beam detection signal PMSYNC.

In the above construction, when the laser beam detection signal PMSYNC from the printer is interrupted by noise or similar cause or when the period thereof is increased due to a decrease in the rotation speed of the polygon motor, the false synchronizing signal ITSYNC from the comparator 42 is outputted to play the role of the read synchronizing signal IMSYNC. Hence, even before the start-up of the polygon motor or even when the printer is not operated, the CCD image sensor 9 for reading a document can be driven by the signal ITSYNC generated within the scanner.

However, the false synchronizing signal ITSYNC generated in the scanner usually has a period slightly longer than the period of the laser beam detection signal PMSYNC from the printer and, in addition, has a fixed value. This brings about a problem that read errors occur while the scanner reads a document. Another problem is that it is difficult to match the image reading device to an external device connected thereto with respect to the synchronizing signal.

Figure 3:
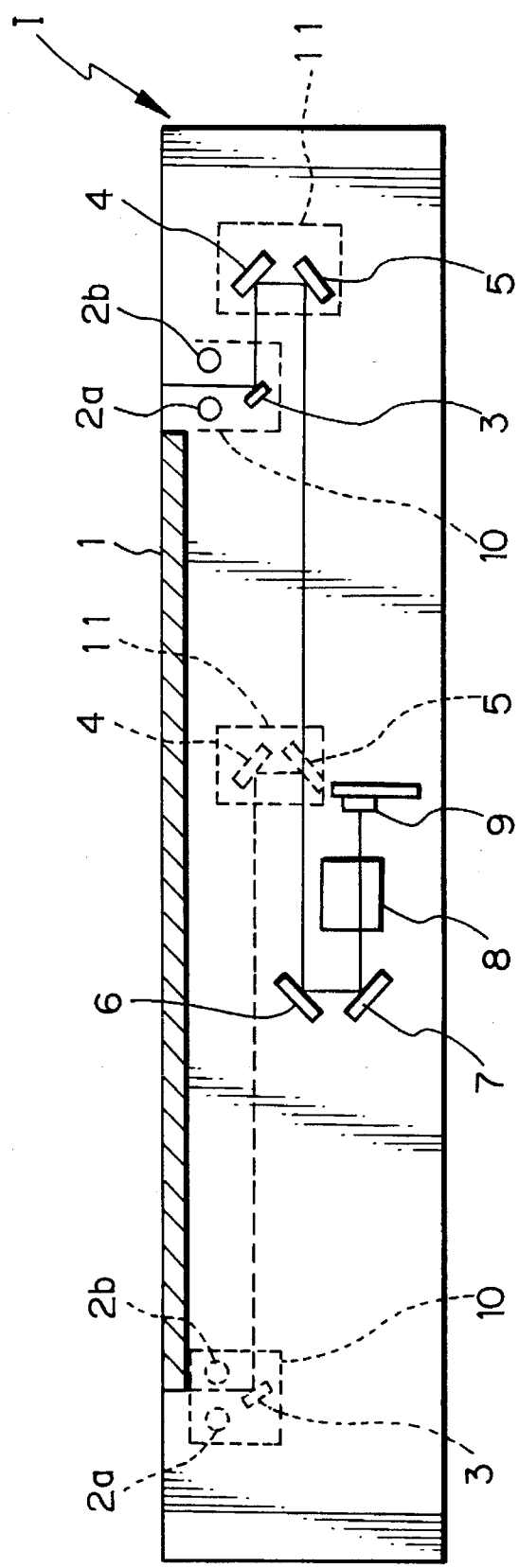
FIG. 3 is a section showing a document reading section included in the digital copier.

Referring to FIG. 3, there is shown a document reading section I included in a digital copier (FIG. 4) and representative of a preferred embodiment of the image reading device in accordance with the present invention. As shown, the document reading section I includes a glass platen 1 on which a document is to be laid. Lamps 2a and 2b are provided for illuminating the document via the glass platen 1. Mirrors 3–7 sequentially refract a reflection from the document to conduct it to a light receiving section. A lens 8 focuses the reflection onto the light-sensitive surface of a CCD image sensor 9. The CCD image sensor 9 converts the incident light to a corresponding electric signal. A first carriage 10 is loaded with the lamps 2a and 2b and mirror 3 and is movable along the underside of the glass platen 1 in a subscanning direction (right-and-left direction in FIG. 3). A second carriage 11 is loaded with the mirrors 4 and 5 and movable at half the speed of the carriage 10 in association with the movement of the carriage 10. The document is read by the CCD image sensor 9 line by line and read in the subscanning direction by the optics including the lamps 2a and 2b and moving along the glass platen 1. In the illustrative embodiment, the document reading section I is constructed to read a document at a density of 16 pixels per millimeter in both the main and subscanning directions. The maximum document size which this section I can read is A3 (297 millimeters×420 millimeters).

Figure 4:
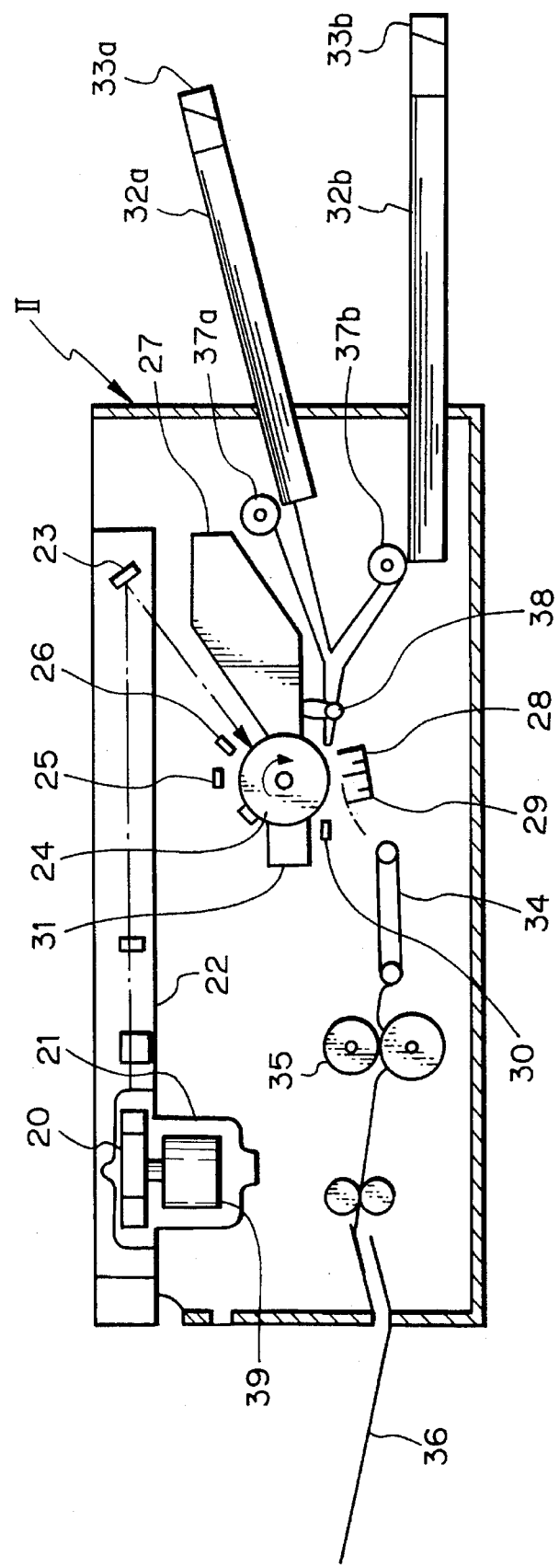
FIG. 4 is a section showing an image recording section also included in the digital copier.

As shown in FIG. 4, the digital copier also includes an image recording section II. The image recording section II has a laser unit 21 incorporating polygonal mirror 20 and outputting a laser beam issuing from a laser diode, not shown, while steering it in the main scanning direction. A lens 22 converges the laser beam onto a photoconductive drum 24 by way of a mirror 23. The laser unit 21, lens 22 and mirror 23 constitute writing optics in combination. A main charger 25, an eraser 26, a developing unit 27, a transfer charger 28, a separation charger 29, a separator in the form of a pawl 30, and a cleaning unit 31 are arranged around the drum 24 for developing a latent image electrostatically formed on the drum 24 by an electrostatographic process and transferring the developed image to a recording sheet. These devices constitute an electrostatic image recording system. There are also shown in the figure sheet cassettes 33a and 33b, a transport belt 34, a fixing roller 35, a copy tray 36, pick-up rollers 37a and 37b, and a register roller 38.

The polygonal mirror 20 is driven by a polygon motor 39 to rotate at a constant high speed. Hence, the laser beam incident on the polygonal mirror 20 is steered to scan the surface of the drum 24. A beam sensor, not shown, is located in close proximity to one axial end of the drum 24. On detecting the laser beam from the polygonal mirror 20, the beam sensor generates a laser beam detection signal PMSYNC which is the basis of a main scan synchronizing signal MSYNC.

The laser diode is ON/OFF controlled on the basis of the HIGH/LOW level of image data representative of a document image, while the turn-on pulse width and, therefore, the irradiation area is changed by pulse width modulation (PWM) in matching relation to the tonality of pixels. After the surface of the drum 24 has been uniformly charged by the main charger 25 to a high potential, the laser beam having been modulated selectively irradiates it to lower the potential. As a result, a potential distribution matching the density distribution of the document image, i.e., an electrostatic latent image is formed on the drum 24 on the basis of the irradiation/nonirradiation and the change in the area of an irradiated portion.

As the latent image is brought to the developing unit 27 due to the rotation of the drum 24, the unit 27 develops it by depositing a toner in amounts matching the potential distribution. Consequently, the latent image is converted to a corresponding toner image. When the toner image on the drum 24 is transported to an image transfer station, the transfer charger 28 transfers it from the drum 24 to a recording sheet 32a or 32b. The sheet 32a or 32b carrying the toner image thereon is separated from the drum 24 by the separation charger 29 and separator 30 and is then transported to the fixing roller 35. A heater is built in the fixing roller 35 and fixes the toner image on the sheet 32a or 32b. Finally, the sheet or copy 32a or 32b is driven out of the copier to the copy tray 36.

In the embodiment, the image recording section II includes two sheet feed lines. Specifically, the sheet 32a is fed from the upper sheet cassette 33a by the pick-up roller 37a while the sheet 32b is fed from the lower sheet cassette 33b by the pick-up roller 37b. The sheet 32a or 32b is first brought to a stop by the register roller 38 and is then driven toward the image transfer station in synchronism with the electrostatographic process. A sheet size sensor is located in the vicinity of the sheet transport path for determining the size of the sheet 32a or 32b fed from the cassette 33a or 33b.

Figure 5:
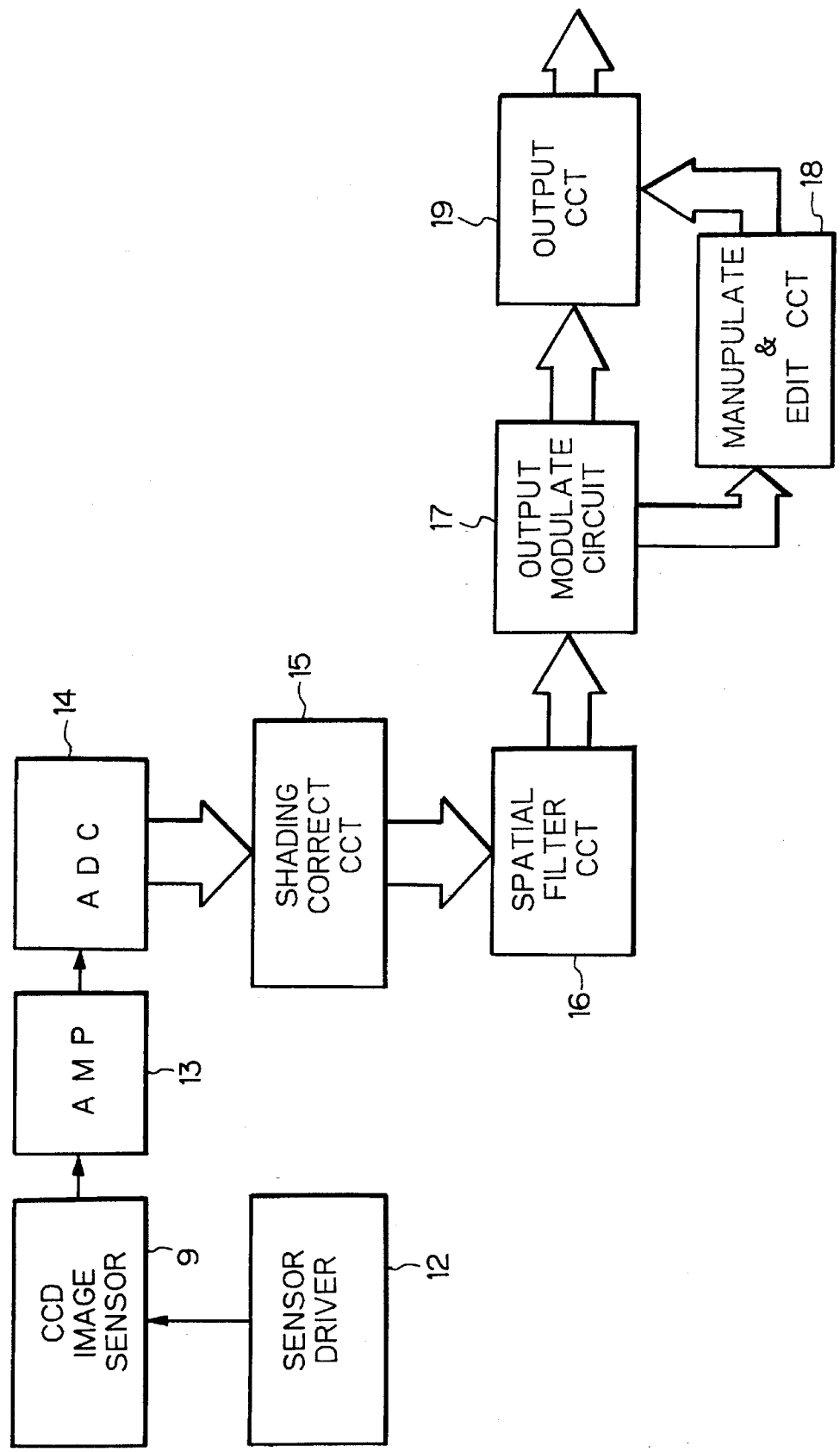
FIG. 5 is a block diagram schematically showing image processing circuitry.

Referring to FIG. 5, image processing circuitry will be described which processes the image signal from the CCD image sensor 9 of the document reading section I and then sends it to the image recording section II. As shown, the circuitry includes a shading correcting circuit 15, a spatial filter circuit 16, an output modulating circuit 17, a manipulating and editing circuit 18, and an output circuit 19. In FIG. 5, the same or similar constituents as or to those shown in FIG. 8 are designated by like reference numerals, and a detailed description will not be made to avoid redundancy.

In FIG. 5, the image signal from the CCD image sensor 9 is amplified by an amplifier (AMP) 13 to a predetermined voltage amplitude and is then converted to digital data having 256 tones per pixel by an ADC 14. The shading correcting circuit 15 corrects the digital data with respect to the irregular illuminations of the lamps 2a and 2b and the irregular sensitivities of the elements constituting the CCD image sensor 9. The spatial filter circuit 16 executes MTF (Modulation Transfer Function) correction for enhancing the resolution of characters and lines, smoothing, i.e., removal of noise of halftone images, etc. The output modulating circuit 17 executes gamma correction for optimizing the image data in matching relation to the mechanical characteristics of the optics included in the image reading section I, and halftone processing taking account of tone reproducibility available with the copier. As a result, the image data is transformed to code data representative of PWM pulse widths and phases corresponding to a write pixel signal. The code data from the output modulating circuit 17 are applied to the output circuit 19 with or without the intermediary of the manipulating and editing circuit 18. Finally, the code data are sent to the image recording section II via the output circuit 19.

Figure 1:
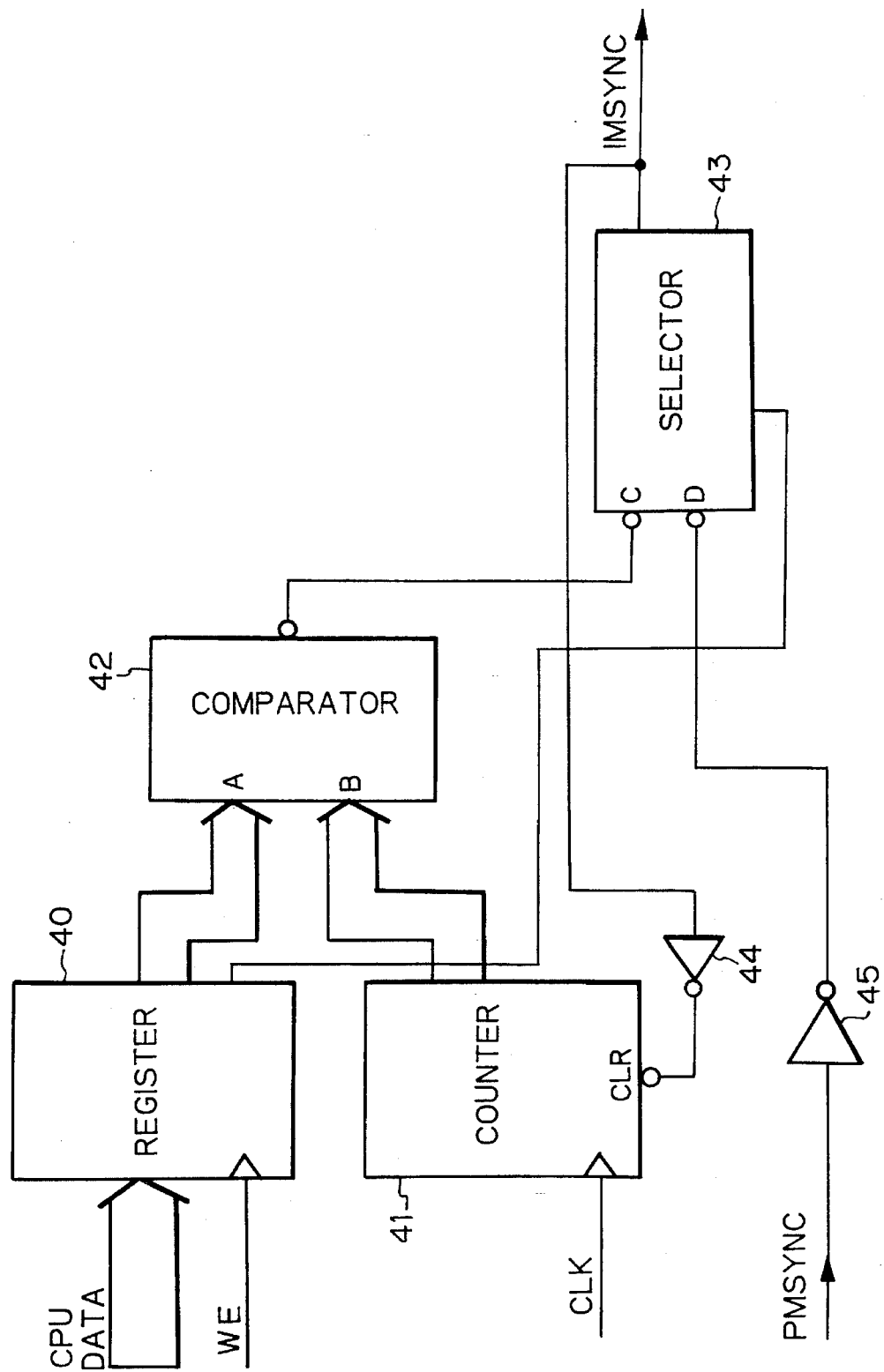
FIG. 1 is a block diagram schematically showing a synchronization generating circuit representative of an embodiment of the present invention and applied to a digital copier.

FIG. 1 shows a synchronization generating circuit for generating a read synchronizing signal IMSYNC to be fed to a sensor driver 12 and image processing circuitry which are shown in FIG. 5. In FIG. 1, the same or similar constituents as those shown in FIG. 9 are designated by like reference numerals, and a detailed description will not be made to avoid redundancy. As shown, the circuit includes a register 40 and a selector 43 having input terminals C, D and S. A constant value to be applied to an input terminal A of a comparator 42 is written in the register 40 beforehand by a CPU (Central Processing Unit) included in the document reading section I. A select signal is also generated by the CPU of the section I and applied to the select terminal S of the selector 43 via the register 40.

A sensor is associated with the polygon motor 39 for monitoring the rotation of the motor 39. While the polygon motor 39 is rotated at a speed higher than a predetermined speed or while a mode for energizing the image recording section II is set up, the CPU causes the selector 43 to select a signal on the input terminal D (laser beam detection signal PMSYNC). On the other hand, when the rotation speed of the motor 39 is lower than the predetermined speed or is zero, the CPU causes the selector 43 to select a signal on the input terminal C (output of the comparator 42) and output it as the read synchronizing signal IMSYNC.

The constant value to be stored in the register 40 by the CPU is freely selectable. For example, assume that a constant value providing the output of the comparator 42 with the same period as the laser beam detection signal PMSYNC or with the same period as a synchronizing signal required by an external apparatus is selected. Then, there can be outputted a synchronizing signal of the same period as when the polygon motor 39 rotates at a usual speed or a synchronizing signal matching the external apparatus as the read synchronizing signal IMSYNC. Further, when the digital copier is used as a facsimile transmitter, it is possible to reduce the deterioration of the polygon motor 39 by deenergizing the motor 39 and using the pulse signal from the synchronization generating circuit as the read synchronizing signal IMSYNC. Also, assuming that the digital copier is used as a copier, the pulse signal generated by the synchronization generating circuit and routed through the comparator 42 may be used as the read synchronizing signal IMSYNC when the scanner prescans a document to detect the position or any marked area of the document. This is successful in noticeably reducing the waiting time up to the start of a copying operation.

Figure 2:
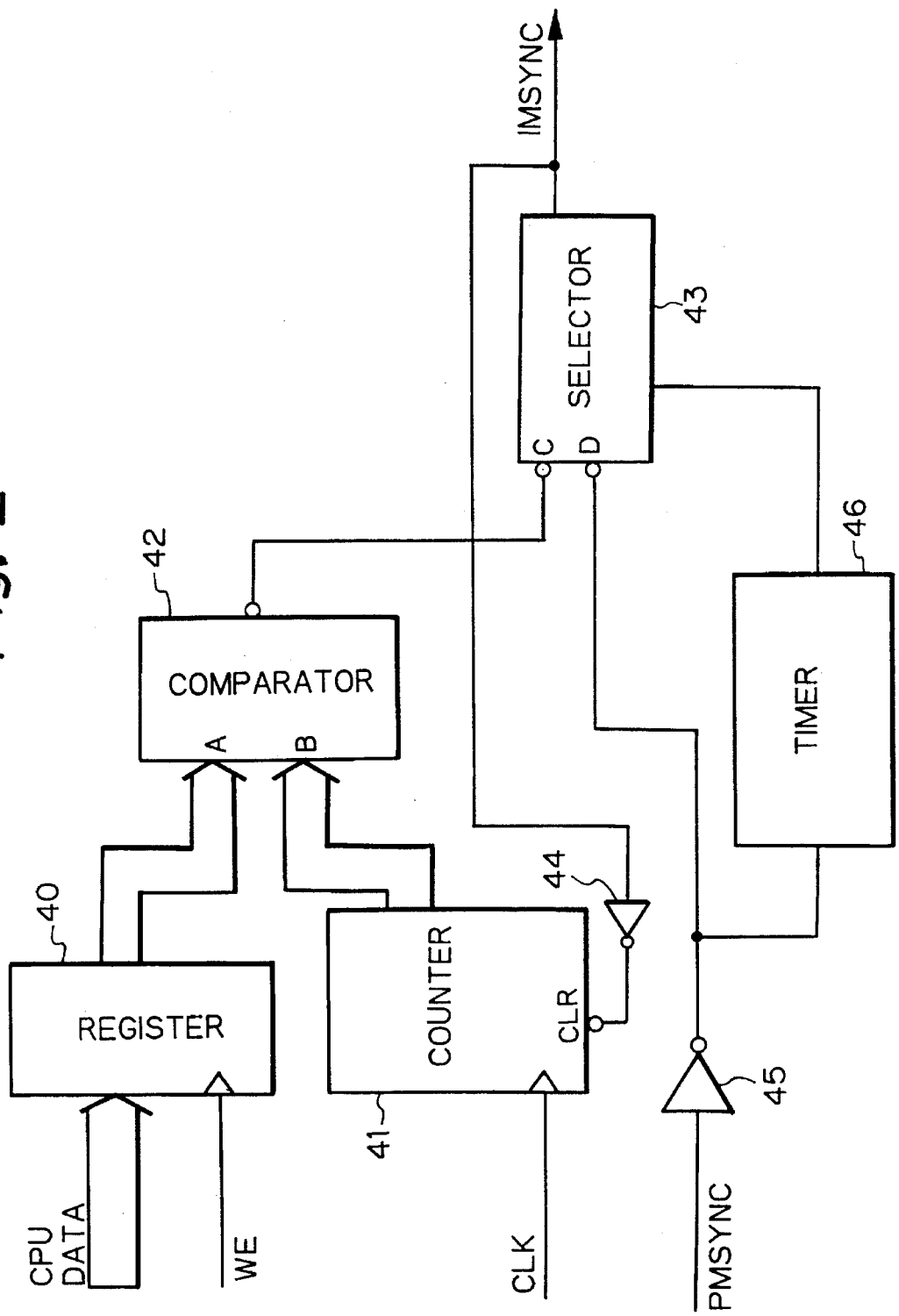
FIG. 2 is a block diagram schematically showing a synchronization generating circuit representative of an alternative embodiment of the present invention.
Figure 6:
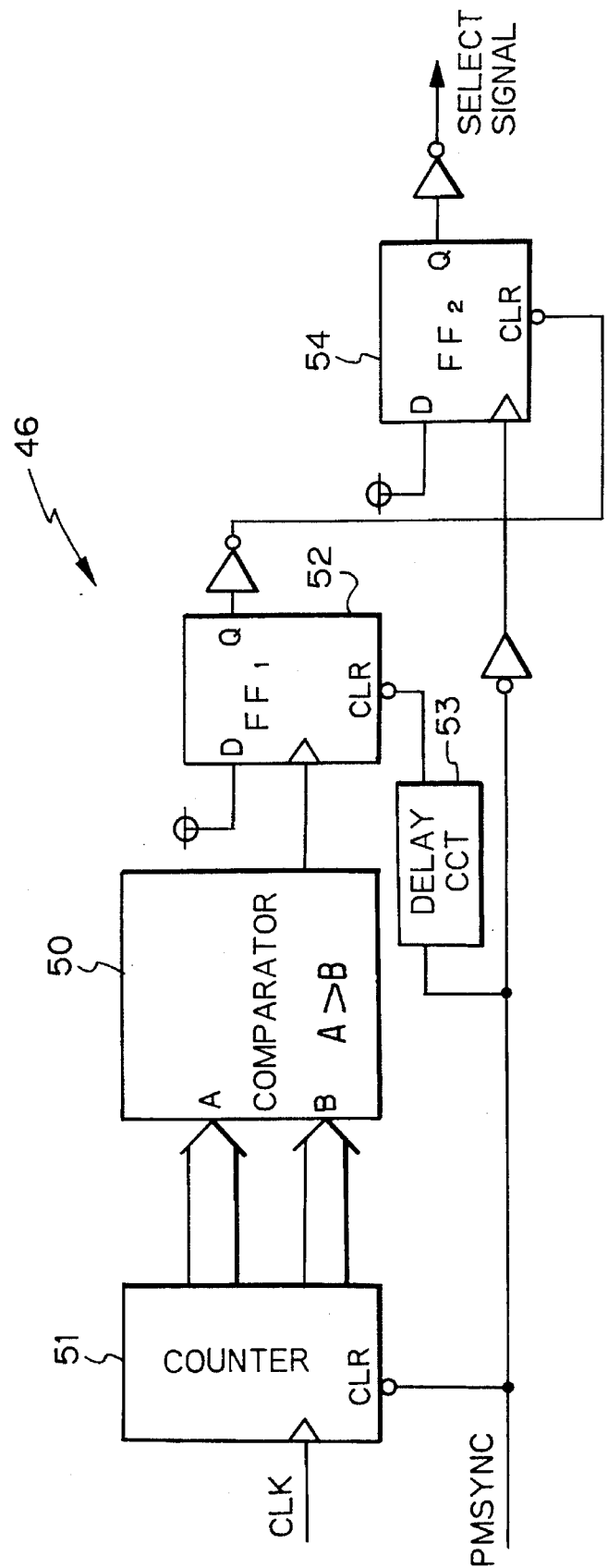
FIG. 6 is a block diagram schematically showing a specific construction of a timer.

FIG. 2 shows a synchronization generating circuit representative of an alternative embodiment of the present invention. In FIG. 2, the same or similar constituents as those shown in FIG. 1 are designated by like reference numerals, and a detailed description will not be made to avoid redundancy. As shown, the circuit additionally includes a timer 46. A specific construction of the timer 46 is shown in FIG. 6. This embodiment allows the synchronization generating circuit to change the read synchronizing signal IMSYNC by its own decision. Hence, the CPU merely has to set a constant value in the register 40 and the synchronization generating circuit can generate the read synchronizing signal IMSYNC having any adequate period.

Specifically, the laser beam detection signal PMSYNC is applied to the terminal D of the selector 43 and the timer 46. At this instant, the pulses of a clock signal CLK for pixel read synchronization are counted. When the number of pulses in a predetermined period of time is smaller than a predetermined number, the timer 46 feeds a select signal to the select terminal S of the selector 43 to thereby change the output of the selector 43. As a result, the selector 43 selects the output of the comparator 42 applied to the input terminal C as the read synchronizing signal in place of the laser beam detection signal PMSYNC on the input terminal D.

The circuit arrangement and operation of the timer 46 will be described specifically with reference to FIG. 6. A counter 51 counts the pulses of the clock signal CLK and delivers the count to a comparator 50. The counter 51 is reset every time the laser beam detection signal PMSYNC arrives. The comparator 50 compares the count applied to an input terminal A from the counter 51 and the constant value applied to an input terminal B. When the count from the counter 51 exceeds the constant value, the comparator 50 generates a pulse signal. The pulse signal is routed through a first flip-flop circuit (FF1) 52 to a clear terminal included in a second flip-flop circuit (FF2) 54. The FF1 52 has a clear terminal to which an inverted signal of the laser beam detect signal PMSYNC is fed via a delay circuit 53.

In response to the pulse signal from the comparator 50, the output of the FF1 52 goes low to reset the FF2 54. As a result, the select signal from the FF2 goes high. On the arrival of the next laser beam detect signal PMSYNC, the counter 51 is reset, and the FF1 52 is also reset on the elapse of a predetermined period of time.

Figure 7B:
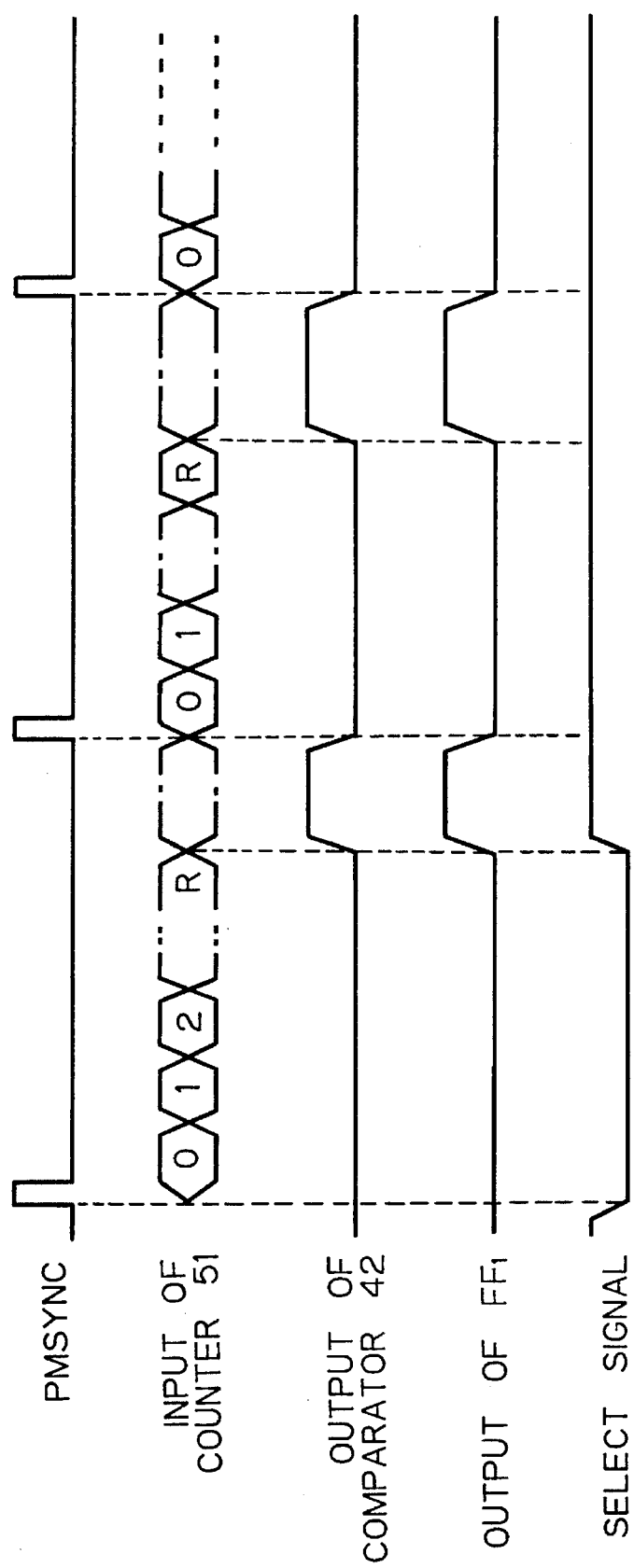
FIG. 7 is a timing chart indicative of various signals appearing in the timer.

Assume that the laser beam detection signal PMSYNC has arrived at the clear terminal of the counter 51 before the counter 51 reaches the constant value. Then, since the output of the comparator 50 is constantly low level, the select signal applied to the select terminal S of the selector 43 is held in a low level. FIGS. 7A and 7B show the various signals appearing in the timer 46 in the latter condition and the former condition, respectively.

In summary, in accordance with the present invention, an internal period signal generated by internal period signal generating means is provided with a predetermined period beforehand. Either the internal period signal or an external period signal from the outside is selected and fed out as a synchronizing signal for a drive circuit which drives a photoelectric transducer. Hence, when the external period signal is not inputted, when the external period signal is not necessary, or when a period signal different in period from the external period signal is needed, the internal period signal capable of having any desired period can be used as the synchronizing signal. It follows that when, for example, recording by an external recording apparatus is not necessary, a document image can be read with a polygon motor held in a halt so as to reduce the deterioration of the motor and can be read by use of a synchronizing signal having a period which an apparatus on the output side requires.

The internal signal generating means counts drive signals which drive the photoelectric transducer pixel by pixel and, every time the count reaches a predetermined count, generates the internal period signal. This eliminates the need for extra signal generating means and, therefore, reduces the production cost of the device.

Furthermore, in accordance with the present invention, a select signal for changing the output of synchronization switching means is outputted on the basis of the period of the external period signal. This allows the external or the internal period signal to be automatically selected on the basis of the period of the external period signal, thereby freeing the operator from a switching operation.

Various modifications will become possible for those skilled in the art after receiving the teachings of the present disclosure without departing from the scope thereof.

What is claimed is:

1. An image reading device, comprising: photoelectric transducer means for scanning an image to read said image line by line and converting resulting optical data to an electric signal;

drive means for driving said photoelectric transducer means in response to a synchronizing signal;

a clock for outputting clock pulses at a predetermined frequency;

a counter for receiving said clock pulses at an input thereof and for outputting an internal period signal;

a CPU for generating a select signal and a constant value signal and for outputting said select signal and said constant value signal to a register, said register outputting said constant value signal and said select signal;

a comparator for receiving, as first and second inputs, the internal period signal output by said counter and said constant value signal output from said register, respectively, and for outputting an internal synchronization signal;

a selector for outputting, as said synchronizing signal, and in accordance with said select signal, either said internal synchronization signal or an external synchronization signal output from an external device.

2. The image reading device according to claim 1, wherein said comparator outputs said clock pulses when the value of said counter is greater than said constant value.

3. The image reading device according to claim 2, further comprising a pair of flip-flops coupled together wherein one of said flip-flops is connected to an output of said comparator.

* * * * *

UNITED STATES PATENT AND TRADEMARK OFFICE
CERTIFICATE OF CORRECTION

PATENT NO. : 5,481,371
DATED : January 2, 1996
INVENTOR(S) : Kouichi KAMON et al.

It is certified that error appears in the above-indentified patent and that said Letters Patent is hereby corrected as shown below:

On the title page, Item [54], and Col. 1, line 2, the title should read:

--IMAGE READING DEVICE HAVING VARIABLE INTERNAL SYNCHRONIZATION SETTING CONTROL--

Signed and Sealed this

Thirtieth Day of April, 1996

Attest:

BRUCE LEHMAN

Attesting Officer *Commissioner of Patents and Trademarks*